Dec. 11, 1934.  C. W. KOHLER  1,983,671
GOLF TEE MAT
Filed March 12, 1932
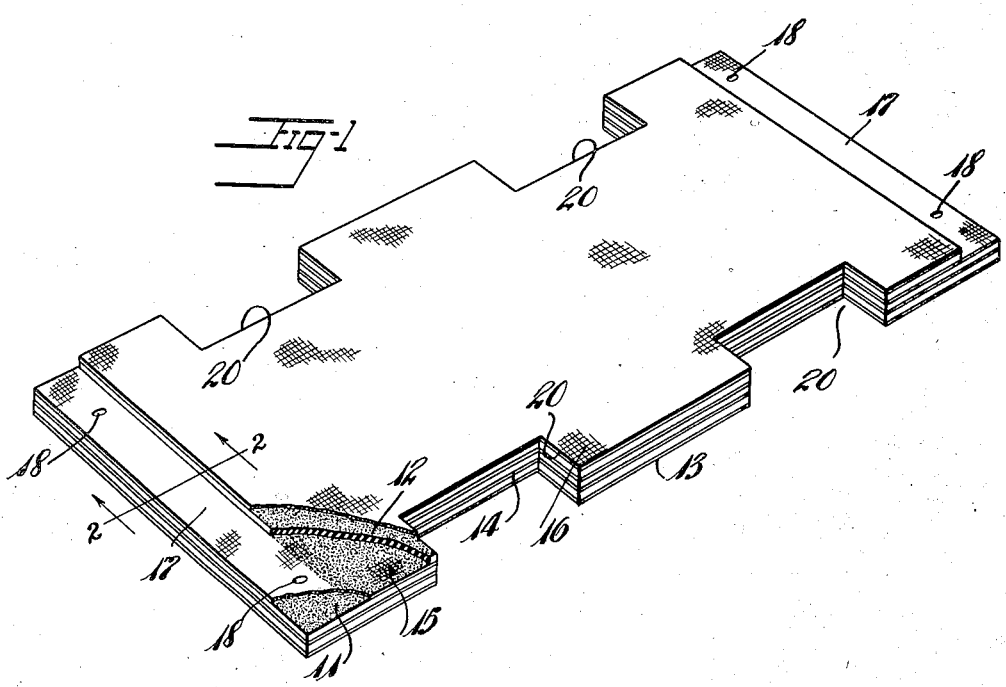
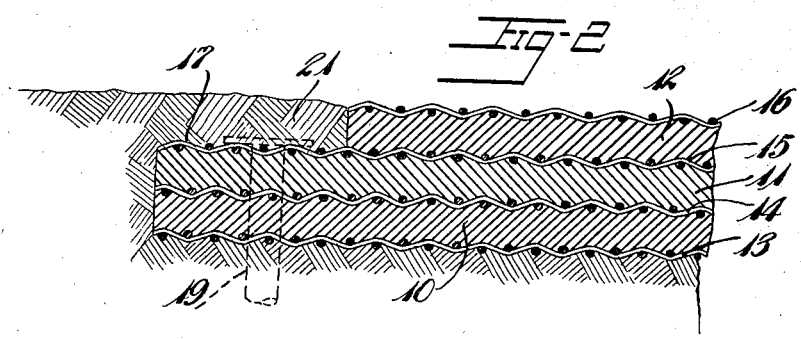
Inventor
Charles W. Kohler
By Eakin & Avery
Attys.

Patented Dec. 11, 1934

1,983,671

UNITED STATES PATENT OFFICE 1,983,671

GOLF TEE MAT

Charles W. Kohler, Akron, Ohio, assignor to The B. F. Goodrich Company, New York, N. Y., a corporation of New York Application March 12, 1932, Serial No. 598,372

8 Claims. (Cl. 154—49)

This invention relates to mats for use on the teeing grounds of golf courses.

At the present time the teeing grounds of golf courses are usually built of soil covered with a layer of level turf in which wooden or composition tees may be readily inserted. The maintenance expense is relatively high and the turf is rapidly worn away or locally injured, especially when used by inexperienced players. As the underlying soil usually contains a large portion of clay which becomes hard and dry when exposed to the sun and air, it becomes difficult to insert wooden tees when the turf is worn away.

The principal objects of the present invention are to provide a mat which will be an acceptable substitute for turf, which will withstand abuse, which may be embedded on a level with the surrounding turf, and may be readily replaced.

Other objects will appear from the following description and the accompanying drawing.

In the drawing:

Fig. 1 is a perspective view of the tee mat, portions being broken away to show the construction.

Fig. 2 is a vertical cross section of the tee mat embedded in a teeing ground, part of the mat and of the ground being broken away, the section being taken on line 2—2 of Fig. 1.

Referring to the drawing, the mat comprises one or more layers of plastic material 10, 11, and 12 and textile layers such as 13, 14, 15, and 16 may be interposed therebetween and over the exposed faces thereof. The plastic material comprising the layers 10, 11, and 12 is preferably plastic composition having the consistency of stiff dough and containing sufficient non-plastic material of low frictional resistance as to extend the plastic and provide a mat having low resistance to penetration, but having sufficient power of recovery to at least partially close openings formed therein by the penetration of tees. The plastic composition may be either vulcanized, partially vulcanized or unvulcanized rubber.

As an illustration of a rubber composition suitable for making such mats the following example is given.

Parts by weight
Wood sawdust, 8 mesh _____ 75
Reclaimed rubber _____ 100

The materials should be thoroughly mixed and may be used without subjecting to vulcanization. The reclaimed rubber is preferably of the type made from tire beads, and mineral fillers such as whiting, clay or zinc oxide may be added to the reclaimed rubber. The relatively large particles of sawdust are themselves compressible. The sawdust may be dyed before using, to color the slab.

Suitable results have also been obtained with reclaimed rubber alone but the addition of oils, waxes, greases, and other softening agents and wood flour, sawdust, whiting, or other vegetable or mineral fillers to reduce the adhesiveness and strength of the rubber is desirable.

Where it is desired to vulcanize any of these compounds the addition of sulfur to the extent of 3 percent of the weight of reclaim may be added.

The plastic layers may also be made by using a certain amount of unvulcanized crude rubber, although the cost of such compounds is greater than when reclaimed rubber alone is used and greater amounts of softening agents and fillers must be added in order to reduce the strength and destroy the adhesiveness to such a degree that tees may be pressed through the material and withdrawn therefrom without difficulty.

As the material of the slabs or layers 10, 11, 12 is of a plastic nature it is desirable to limit the flow of the material when under pressure to a certain extent and for this purpose reinforcing layers 13, 14, 15 and 16 may be incorporated in the mat. These may generally consist of any loosely woven or foraminous material such as netting formed either of vegetable fiber or metallic wire or of other penetrable or perforated sheet material. I have found, for example, that these reinforcements may be economically constructed of burlap or similar textile material.

The layer 16 may be dyed to match the surrounding turf.

When the mat is built up of a plurality of plastic layers I prefer to form the complete mat so that the underlying layers extend beyond the top layer at two opposite margins of the mat as at 17, 17 and to form openings 18 therethrough so that pins 19 may be passed through the mat into the sub-soil to hold the mat in place. The other margins of the mat may be notched as at 20 so as to interlock with the surrounding soil. The soil or turf may be placed over the shouldered ends 17 as at 21 to conceal the fastening devices.

The reinforcing layer 15 extending over the shouldered ends 17 assists in retaining the mat on the anchoring pins 19.

In the use of the device wood or composition tees may be readily inserted at any position on the mat. As the tee is withdrawn the plastic material recovers to such an extent as to partially close the opening so that other tees may be inserted thereafter in the same or other positions.

I claim:

1. A tee mat comprising a layer of rubber composition having low resistance to penetration and sufficient recovery to automatically partially close an opening formed by insertion on a tee therein.

2. A tee mat comprising a layer consisting chiefly of reclaimed rubber having low resistance to penetration.

3. A tee mat comprising a layer consisting chiefly of reclaimed rubber and containing a sufficient quantity of non-plastic filling material to substantially reduce its adhesiveness and resistance to penetration.

4. A tee mat comprising a layer formed of a mixture of reclaimed rubber and wood sawdust and having low resistance to penetration.

5. A tee mat comprising a layer of plastic rubber material having a low resistance to penetration of a golf tee, and reinforcing layers of penetrable material.

6. A tee mat comprising a plurality of layers of distortable plastic material having low resistance to penetration of a golf tee, and interposed layers of textile reinforcing material.

7. A tee mat comprising a plurality of layers of distortable plastic material having low resistance to penetration of a golf tee, and reinforcing layers of burlap.

8. A tee mat comprising a firm layer of reclaimed rubber having low resistance to penetration and superimposed thereon a layer of burlap.

CHARLES W. KOHLER.